Aug. 10, 1926.  
J. H. STEDMAN  
1,595,581
RUBBER INTERIOR DECORATIVE UNIT
Filed Jan. 21, 1925
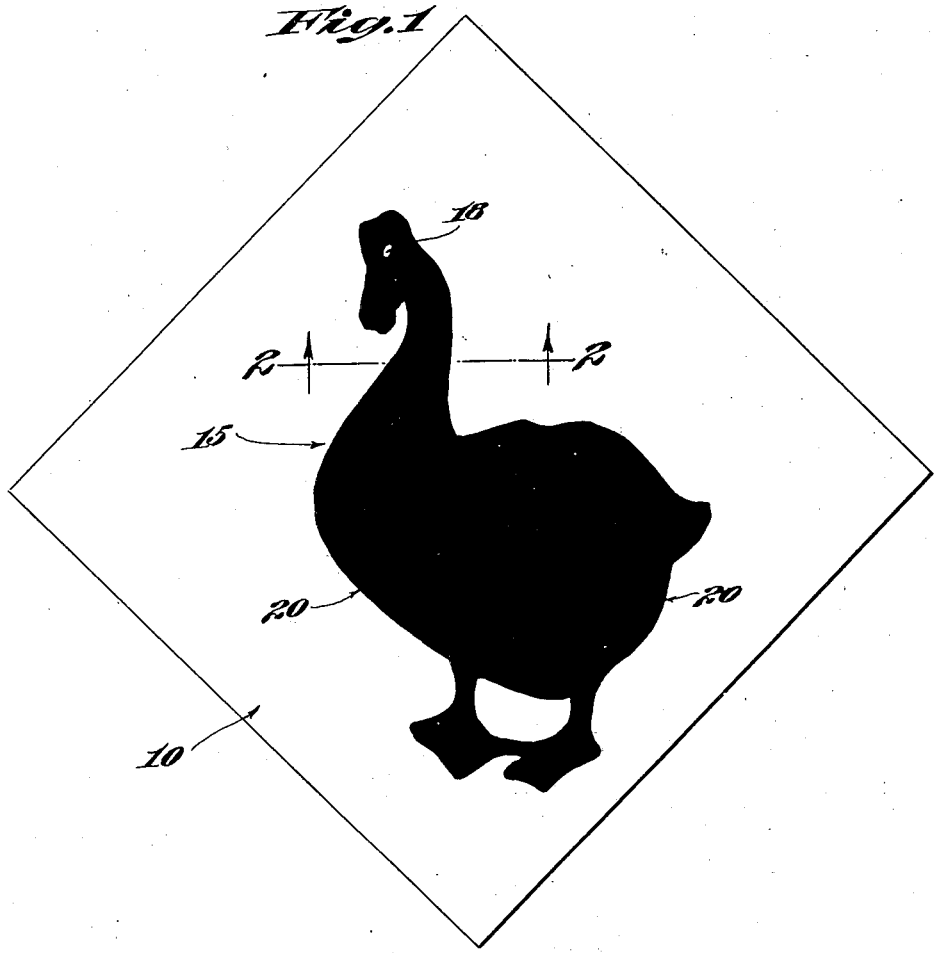
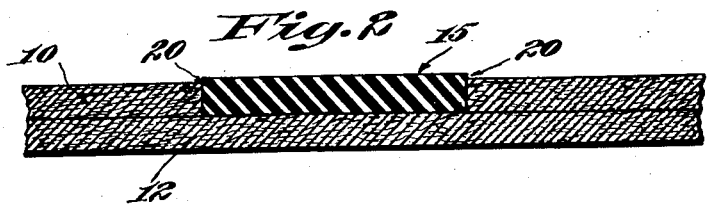
Inventor  
James H. Stedman  
by Warren G. Ogden  
his atty.

Patented Aug. 10, 1926.

1,595,581

UNITED STATES PATENT OFFICE.

JAMES H. STEDMAN, OF BRAINTREE, MASSACHUSETTS.

RUBBER INTERIOR DECORATIVE UNIT.

Application filed January 21, 1925. Serial No. 3,825.

This invention relates to inlaid interior decorative units manufactured from rubber and used for floor tiling, wall pieces for wainscoting, border pieces for floors or walls, and individual pieces of special shape and size to suit a particular use, as an ash tray, saucer, breakfast table tile and the like.

Heretofore such inlaid rubber units have not had any great vogue because of the fact that ordinary rubber compounds will spew at the joint between two adjoining pieces, during vulcanization.

I have discovered a process of making rubber inlays that results in a product having joints that are clean and absolutely spewless, thus preserving in the finished article all the beauties of outline and other characteristic features of the inlaid figure.

In accordance with this discovery the invention comprises the process of manufacture hereinafter described and the novel article produced by its practice, its true scope being pointed out in the appended claim.

The accompanying drawing illustrates in Figure 1 one inlaid rubber decorative unit that may be produced by practicing the process, and Fig. 2 is a cross-section, greatly enlarged, on line 2—2 of Fig. 1, after insertion of the inlay but before vulcanization. It will be understood that the limitations of pen and ink delineation prevent a perfect illustration of colors and that the invention includes within its scope an inlay which may be composed of several pieces properly cut and fitted to form the desired figure and of such combination of colors as may be pleasing in an æsthetic sense or truly representative of the subject as, for example, the brilliant coloring of a parrot.

In practicing the preferred process of making the rubber inlay a rubber color compound is mixed in accordance with the formula in use at the particular factory with the addition, however, of a fibre content in such percentage as has been found requisite to give the compound a sluggish action when placed under pressure. The fibre reinforcement may conveniently be cotton, as obtained from uncured friction scrap of almost any nature, and the rubber stock may conveniently be prepared in accordance with the description found in my Letters Patent of the United States No. 1,482,952 for reinforced rubber flooring and process of making the same, dated February 5, 1924.

These compounds, of various colors, are formed into sheets, about one-eighth of an inch thick as finally produced from the calender in the usual mill process, and each sheet is provided with a backing of substantially the same thickness that may be of the same material or of different material so that the sheet to be used for the inlay is a two-ply rubber sheet the upper layer at least being reinforced with cotton fibre or the like. The sheets may be vari-colored according to the final framing effect desired. Such a sheet, of white rubber, cut to a square outline is shown in the drawing, the upper ply being indicated by 10 and the lower ply or backing being indicated by 12.

The upper ply 10 is then cut through and a piece removed leaving an opening, backed by the ply 12, of the shape of the figure that is to be inlaid. In the illustration, the representation of a duck 15 is shown as the figure that is to form the inlay, it being understood that a clean severance is made through the material of the ply 10 in exact duplication of the outline of the figure chosen for the inlay. In some instances a die may be used but in others the material can better be removed by hand cutting.

The figure which forms the inlay will be cut in the same manner from another sheet, but of one ply thickness. This inlay is formed of reinforced rubber and is of some contracting color to the sheet which has been prepared to receive it. As illustrated a black duck 15, having a white eye 18 is inlaid on a white tile as a background as illustrative of one article that may be produced.

The figure 15 is cut from reinforced rubber that is slightly thicker, by three to five thousandths of an inch, than the ply 10 so that when placed in the opening formed in the ply 10 its exposed surface lies in a little higher plane than the surface of the surrounding sheet (see Fig. 2). This provides for a perfect bond at the joint 20 between the two pieces when pressure is applied in the step of vulcanizing, under heat, in a press suited to this purpose. This perfect bond is formed in like manner at any joint between two pieces of the inlay when more than one color is used in making the figure to be inlaid. After vulcanization the entire surface is in the same plane.

The shrinkage of reinforced rubber is greater than in unreinforced rubber, being about five-eighths of an inch in forty-two inches or slightly over one per cent, hence great care must be taken that in cutting all pieces forming a part of the inlay the grain of the fibre runs in the same direction in each when they are assembled. Furthermore, for perfect results, the fibre grain in the inlay must likewise run parallel to the fibre grain in the sheet prepared to receive the inlay. If these precautions are not taken, when using reinforced rubber, then the heavy shrinkage will occur in different directions and the figure will be distorted. After taking these precautions the finished article presents an inlaid figure, in true proportion, that stands out clearly on its background or frame formed by the two-ply sheet.

The beauty and commercial success of the product is largely due to the use of reinforced rubber compounds in preparing the various articles. The cotton, whether spun, raw, cleaned, waste, or other fibrous reinforcing medium functions to resist or retard interflow between the various compounds when pressure is applied during vulcanization. This retardative medium throughout the compound effectually prevents the rubber from spewing at the joints by slowing up the flow caused by the pressure, the result being a clean joint, showing the true outline of the complete figure and of all parts thereof that are inlaid in different colors. Practice has demonstrated that it is not possible to obtain these clean joints with unreinforced rubber compounds because the flow of this rubber, when under pressure, is wholly uncontrolled.

The nature and characteristics of the novel decorative unit having been specifically described and the preferred method of manufacture having been explained, what is claimed as new, is:—

1. The process of making interior decorative units which includes the step of preparing a two ply sheet of fibre reinforced rubber, cutting out a figure of the desired shape from one ply leaving an opening with the other ply as a backing, cutting out the same figure for an inlay from another piece of fibre reinforced rubber, slightly thicker than the ply in which the opening has been cut, inserting the inlay loosely in the opening, and vulcanizing the inlay to the sheet in a suitable mold under sufficient pressure to produce a smooth inlay surface on the decorative unit.

2. The process of making interior decorative units which includes the step of preparing a sheet of rubber having a front ply and a back ply, the front ply at least being reinforced with a cotton fibre or the like, cutting out a figure of the desired shape from the front ply only, reproducing said figure for an inlay from another piece or pieces of fibre reinforced rubber, slightly thicker than the ply in which the opening has been cut, inserting the inlay loosely in the opening, and vulcanizing the inlay to the sheet in a suitable mold under sufficient pressure to produce a smooth inlay surface on the decorative unit.

3. A rubber interior decorative unit comprising a rubber inlay having a figure of fibre reinforced rubber inlaid on a sheet of fibre reinforced rubber, the joint between the inlaid figure and the rubber of the surrounding sheet showing the true outline of the figure without spewage at said joint between the inlay and sheet.

4. A rubber interior decorative unit comprising a rubber inlay having a figure of fibre reinforced rubber inlaid on a sheet of fibre reinforced rubber with the grain of the fibre throughout the inlaid material running in the same direction as the fibre grain of the sheet on which it is inlaid, whereby distortion by shrinkage is eliminated, and spewless joints wherever two distinct pieces of material abut each other.

JAMES H. STEDMAN.